Sept. 15, 1925.
L. F. DAY ET AL
COLLECTING DEVICE
Filed Aug. 7, 1924
1,553,513
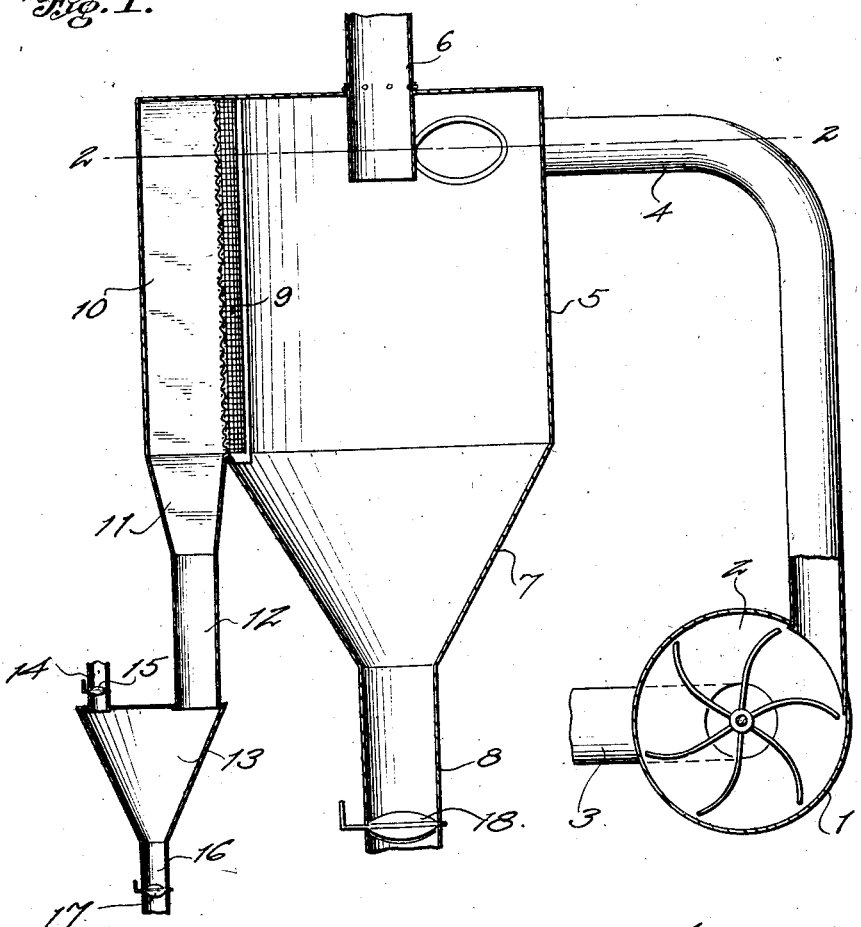
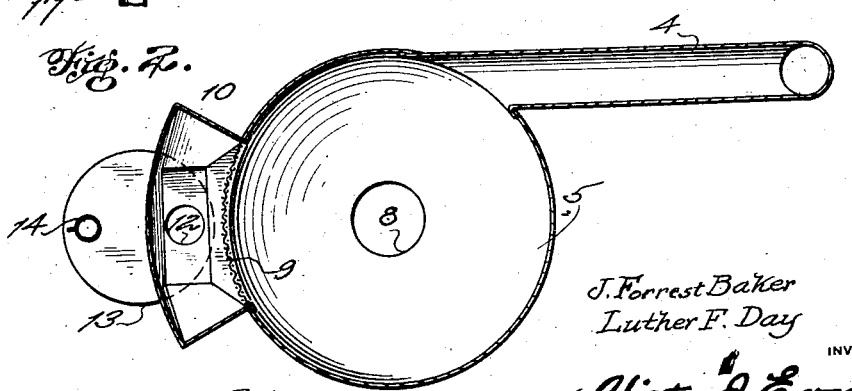

Patented Sept. 15, 1925.

1,553,513

UNITED STATES PATENT OFFICE.

LUTHER F. DAY AND JESSE FORREST BAKER, OF LAMAR, COLORADO.

COLLECTING DEVICE.

Application filed August 7, 1924. Serial No. 730,677.

*To all whom it may concern:*

Be it known that we, LUTHER F. DAY and JESSE FORREST BAKER, citizens of the United States, residing at Lamar, in the county of Prowers and State of Colorado, have invented new and useful Improvements in Collecting Devices, of which the following is a specification.

The object of this invention is the provision of means in an alfalfa meal mill for collecting the fine or pulverized alfalfa meal before, as it enters or after it enters the cyclone.

For a comprehensive understanding of our improvement, reference is to be had to the following detailed description, taken in connection with the accompanying drawing and fully pointed out in the appended claims.

In the drawings:—

Figure 1 is an approximately central vertical longitudinal sectional view through an alfalfa meal mill to illustrate one application of the improvement.

Figure 2 is a sectional view approximately on the line 2—2 of Figure 1.

As is well known to those skilled in the art to which this invention relates an alfalfa hay grinder is used to cut the alfalfa hay into a meal. A fan or blower takes the meal from the grinder and delivers the same into a funnel-shaped compartment, commonly known as a cyclone. The cyclone is placed in elevation above the packer and has a funnel-shaped bottom connected to the packer and is used solely for separating the air from the meal as received from the fan or blower. The cyclone has a closed top in which is let an air outlet pipe or vent. On entering the cyclone the meal is subjected to centrifugal motion by the blasts of air, and the air and meal are separated, the meal being forced in a downward direction and the air escapes through the outlet pipe or vent at the top of the cyclone. With the ordinary construction of such devices, the fine or pulverized meal is not separated from the coarser particles thereof, and it is the purpose of this invention to produce simple means for simultaneously accomplishing this separation. Alfalfa meal, as generally produced, has been found a valuable feed for live stock, the fine pulverized or dust portions of the meal is not, however, a desired ingredient in stock feed as this dust enters the nostrils of the animals and materially interferes with mastication. The pulverized meal, or dust, however, has been found to be a valuable and fattening feed for poultry, and therefore, the desirability and value of separating the coarse meal from the dust or pulverized parts thereof will be appreciated. Before proceeding we desire to emphasize the fact that our improvement may be applied directly to the pipe to which the blower fan is connected, or at any point where the blower fan circulates the meal or against a screen which must be enclosed by a housing that forms part of the cyclone and therefore the arrangement of our improvement is not to be restricted to that disclosed by the drawings.

Referring now to the drawings in detail the numeral 1 designates a casing in which a blower fan 2 is mounted. Suitable means, not shown, is employed for revolving the fan. Connected to one side and communicating with the casing there is the intake tube 3 for the alfalfa meal. The tube 3 is, of course, connected to the grinding machine (not shown).

The tubular outlet from the fan casing for the meal is indicated by the numeral 4 and communicates with a cyclone 5 at a point adjacent to and at one side of the closed top thereof. The closed top of the cyclone is centrally provided with an opening through which passes an air vent tube 6. The tube is extended below the inlet mouth of the tubular conductor member 4. The cyclone has a substantially funnel-shaped bottom portion 7 that terminates in a tubular extension or mouth 8 which, of course, provides a meal outlet.

In the showing of the drawing we provide one side of the cyclone 5, from a point adjacent to the closed top thereof, with an opening, the said opening being closed by a screen 9. If desired this portion of the cyclone may be perforated in which instance the screen is not required. The reticulated opening 9 is closed by a housing 10. The housing has its lower portion, that is the portion of the housing below the screen 9, preferably flared or of funnel-shape, as at 11, the said portion 11 terminating in a tubular outlet 12. The outlet 12 communicates with a bin 13. The top of the bin is closed but is provided with an air duct 14, normally closed by a valve 15. The bin 13 has a funnel-shaped outlet spout 16 whose passage is controlled by a valve 17. The bin 13 may be entirely dispensed with, in which instance, the outlet pipe 12 has its passage controlled by a valve similar to the valve 17.

As previously stated, the meal forced into the cyclone by the blasts is subjected to a centrifugal action in the said cyclone. The pressure of the air in the housing 10 must equal that of the air on the inside of the cyclone and to accomplish this the outlet 12, from the housing must be normally closed. The outlet from the housing 10 has connected thereto a packer, sack or any other closed receptacle in which the meal dust or pulverized meal is received. The coarser meal will be forced downwardly through the cyclone 5 to the tubular extension or mouth 8 thereof, and this coarser meal is also delivered into a packer, sack or other closed receptacle. The air, as previously stated, finds an outlet through the pipe or vent 6 in the top of the cyclone, and by a simple construction as above described, we separate and save both the coarse and finer particles of meal.

Having described the invention, we claim:—

1. In an apparatus for separating the light and fine particles of alfalfa meal from the coarse and heavier particles of such meal and for preserving both products, including a cyclone having an air vent in the top thereof, means for forcing meal under air pressure into the cyclone and subjecting the said meal to centrifugal action when in the cyclone and a screened housing associated with the cyclone and into which the powdered and dust particles of the meal is forced in its said centrifugal action.

2. An alfalfa meal mill for separating and preserving the fine and lighter particles from the coarse and heavier particles of the meal, including a cyclone having an outer air outlet pipe projecting through the closed top of the cyclone, and having a lower normally closed meal outlet, a tubular meal conductor communicating with the cyclone adjacent to the top thereof and above the inner end of the air outlet pipe, a blower fan in the tubular conductor, said cyclone having its body provided with a reticulated portion, a housing covering the said reticulated portion of the body and said housing having a lower pipe outlet which is normally closed.

3. A means for simultaneously separating the finer and lighter from the heavier and coarser particles of alfalfa meal, and for preserving both products, comprising, in combination, a receptacle having an air vent pipe entering from the top thereof, a valve controlled outlet pipe in the bottom thereof, a blower fan having a pipe communicating with one side of the receptacle, adjacent to the top thereof, and through which alfalfa meal is forced into and subjected to a centrifugal action when in the receptacle, a housing having an apertured inner face which establishes a communication with the receptacle and into which housing the finer particles of the meal is forced, said housing having a lower valve controlled outlet designed for communication with a packer or the like into which the powdered meal is delivered, and which packer closes the said outlet when the valve therefor is opened.

4. A means for simultaneously separating and for preserving the fine and lighter particles from the coarser and heavier particles of alfalfa meal, comprising, in combination, a cyclone having an air vent pipe entering from the top thereof, said cyclone having an opening in the side thereof, a housing surrounding the opening, a mesh closing the opening, a pipe communicating with the cyclone at a point angular with respect to the housing, and the inlet of the pipe being disposed below the outlet of the air vent pipe, a valve controlled outlet at the bottom of the cyclone, a valve controlled outlet at the bottom of the housing, means including a fan for creating a circulation of air and forcing alfalfa meal through the pipe into the cyclone and subjecting the said meal to centrifugal action in the cyclone, to cause the finer particles of the meal to pass through the mesh and enter the housing, and to likewise separate the air from the meal to permit of the said air finding an outlet through the vent pipe.

In testimony whereof we affix our signatures.

JESSE FORREST BAKER.
LUTHER F. DAY.